(12) United States Patent
Zhu et al.

(10) Patent No.: US 12,550,020 B2
(45) Date of Patent: Feb. 10, 2026

(54) TECHNIQUES FOR MEASURING NEIGHBOR CELLS USING PRIORITIZATION OF THE NEIGHBOR CELLS THAT IS BASED AT LEAST IN PART ON ASSOCIATIONS OF THE NEIGHBOR CELLS WITH NETWORK OPERATORS

(71) Applicant: QUALCOMM Incorporated, San Diego, CA (US)

(72) Inventors: Xianwei Zhu, Beijing (CN); Junli Wu, Beijing (CN); Xuqiang Zhang, Beijing (CN); Jianqiang Zhang, Beijing (CN); Ling Xie, Beijing (CN); Kuo-Chun Lee, San Diego, CA (US); Arvind Vardarajan Santhanam, San Diego, CA (US); Xiaochen Chen, Beijing (CN); Shan Qing, San Diego, CA (US); Xiaoning Lu, San Diego, CA (US); Yong Hou, Beijing (CN); Peng Hu, Beijing (CN); Yifan Du, Beijing (CN); Wei-Jei Song, San Diego, CA (US); Tom Chin, San Diego, CA (US); Mingchun Yang, San Diego, CA (US); Rajeev Pal, San Diego, CA (US); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/248,184

(22) PCT Filed: Dec. 16, 2020

(86) PCT No.: PCT/CN2020/136683
§ 371 (c)(1),
(2) Date: Apr. 6, 2023

(87) PCT Pub. No.: WO2022/126405
PCT Pub. Date: Jun. 23, 2022

(65) Prior Publication Data
US 2023/0370916 A1 Nov. 16, 2023

(51) Int. Cl.
*H04W 36/00* (2009.01)
*H04W 36/08* (2009.01)
*H04W 36/14* (2009.01)

(52) U.S. Cl.
CPC . *H04W 36/0085* (2018.08); *H04W 36/00835* (2018.08); *H04W 36/08* (2013.01); *H04W 36/144* (2023.05)

(58) Field of Classification Search
CPC ............... H04W 36/0085; H04W 36/00835
See application file for complete search history.

(56) References Cited

U.S. PATENT DOCUMENTS

2009/0047957 A1* 2/2009 Westerberg ........... H04W 48/12
455/436
2022/0272586 A1* 8/2022 Takeda .............. H04W 36/0016

FOREIGN PATENT DOCUMENTS

| EP | 2863680 A1 | 4/2015 |
|---|---|---|
| WO | 2009025610 A1 | 2/2009 |
| WO | 2014012804 A1 | 1/2014 |

OTHER PUBLICATIONS

Ericsson: "Considerations on RAN Sharing Scenarios", 3GPP TSG-RAN WG3 Meeting #87bis, R3-150732, No. Tenerife, Spain, Apr. 20, 2015-Apr. 24, 2015, 6 Pages. Apr. 24, 2015.

(Continued)

*Primary Examiner* — Nabil H Syed
(74) *Attorney, Agent, or Firm* — Dalei Dong; Harrity & Harrity, LLP

(57) ABSTRACT

Various aspects of the present disclosure generally relate to wireless communication. In some aspects, a user equipment (Continued)

(UE) may receive, from a base station associated with a first radio access technology (RAT), a neighbor cell list including entries for at least a first set of neighbor cells and a second set of neighbor cells, the first set of neighbor cells and the second set of neighbor cells associated with a second RAT. The UE may determine that the first set of neighbor cells is associated with a first network operator and that the second set of neighbor cells is associated with a second network operator. The UE may measure at least one neighbor cell of the neighbor cell list based at least in part on prioritization of the first set of neighbor cells relative to the second set of neighbor cells. Numerous other aspects are described.

30 Claims, 7 Drawing Sheets

(56) References Cited

OTHER PUBLICATIONS

International Search Report and Written Opinion—PCT/CN2020/136683—ISA/EPO—Sep. 23, 2021.

* cited by examiner

TECHNIQUES FOR MEASURING NEIGHBOR CELLS USING PRIORITIZATION OF THE NEIGHBOR CELLS THAT IS BASED AT LEAST IN PART ON ASSOCIATIONS OF THE NEIGHBOR CELLS WITH NETWORK OPERATORS

CROSS-REFERENCE TO RELATED APPLICATION

This application is a 371 national stage application of PCT Application No. PCT/CN2020/136683 filed on Dec. 16, 2020, entitled "TECHNIQUES FOR MEASURING NEIGHBOR CELLS USING PRIORITIZATION OF THE NEIGHBOR CELLS THAT IS BASED AT LEAST IN PART ON ASSOCIATIONS OF THE NEIGHBOR CELLS WITH NETWORK OPERATORS," which is hereby expressly incorporated by reference herein.

FIELD OF THE DISCLOSURE

Aspects of the present disclosure generally relate to wireless communication and to techniques and apparatuses for techniques for measuring neighbor cells using prioritization of the neighbor cells that is based at least in part on associations of the neighbor cells with network operators.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station associated with a first radio access technology (RAT), a neighbor cell list including entries for two or more sets of neighbor cells including at least a first set of neighbor cells and a second set of neighbor cells, the first set of neighbor cells and the second set of neighbor cells associated with a second RAT; determining that the first set of neighbor cells is associated with a first network operator and that the second set of neighbor cells is associated with a second network operator; and measuring at least one neighbor cell of the neighbor cell list based at least in part on prioritization of the first set of neighbor cells relative to the second set of neighbor cells.

In some aspects, prioritization of the first set of neighbor cells relative to the second set of neighbor cells comprises: deprioritizing the second set of neighbor cells relative to the first set of neighbor cells; or pruning entries for the second set of neighbor cells from the neighbor cell list.

In some aspects, the method includes prioritizing the first set of neighbor cells relative to the second set of neighbor cells based at least in part on one or more of: the UE having access to a first network associated with the first network operator and not having access to second network associated with the second network operator, or the UE being a subscriber of the first network operator and not being a subscriber of the second network operator.

In some aspects, the method includes prioritizing the first set of neighbor cells relative to the second set of neighbor cells based at least in part on one or more of: pruning the second set of neighbor cells or prioritizing the first set of neighbor cells relative to the second set of neighbor cells based at least in part on the first set of neighbor cells being associated with the first network operator; pruning the second set of neighbor cells or deprioritizing the second set of neighbor cells relative to the first set of neighbor cells based at least in part on the second set of neighbor cells being associated with the second network operator; or pruning the second set of neighbor cells or deprioritizing the second set of neighbor cells relative to the first set of neighbor cells based at least in part on the second set of neighbor cells not being associated with the first network operator.

In some aspects, the determination that the first set of neighbor cells is associated with a first network operator and that the second set of neighbor cells is associated with a second network operator comprises: determining, based at least in part on downlink raster values associated with neighbor cells of the first set of neighbor cells, that the first set of neighbor cells is associated with the first network operator; and determining, based at least in part on downlink raster values associated with neighbor cells of the second set of neighbor cells, that the second set of neighbor cells is not associated with the first network operator.

In some aspects, the determination that the first set of neighbor cells is associated with a first network operator and that the second set of neighbor cells is associated with a second network operator comprises: determining, based at least in part on obtaining background public land mobile network (BPLMN) information associated with neighbor cells of the first set of neighbor cells, that the first set of neighbor cells is associated with the first network operator; and determining, based at least in part on obtaining BPLMN information associated with neighbor cells of the second set of neighbor cells, that the second set of neighbor cells is not associated with the first network operator.

In some aspects, the method includes one or more of: obtaining the BPLMN information associated with neighbor cells of the first set of neighbor cells based at least in part on a BPLMN search; or obtaining the BPLMN information associated with neighbor cells of the second set of neighbor cells based at least in part on a BPLMN search.

In some aspects, the first network operator is associated with a first public land mobile network (PLMN), and wherein the second network operator is associated with a second PLMN.

In some aspects, the base station provides a cell for the first network operator and the second network operator using the second RAT.

In some aspects, the method includes transmitting, to the base station, a measurement report that indicates a preferred cell, of the first set of neighbor cells, for one or more of a redirection or a handover operation.

In some aspects, a UE for wireless communication includes a memory; and one or more processors operatively coupled to the memory, the memory and the one or more processors configured to: receive, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT; determine that the first set of neighbor cells is associated with a first network operator and that the second set of neighbor cells is associated with a second network operator; and measure at least one neighbor cell of the neighbor cell list based at least in part on prioritization of the first set of neighbor cells relative to the second set of neighbor cells.

In some aspects, the one or more processors are further configured to: deprioritize the second set of neighbor cells relative to the first set of neighbor cells; or prune entries for the second set of neighbor cells from the neighbor cell list.

In some aspects, the one or more processors are further configured to prioritize the first set of neighbor cells relative to the second set of neighbor cells based at least in part on one or more of: the UE having access to a first network associated with the first network operator and not having access to second network associated with the second network operator, or the UE being a subscriber of the first network operator and not being a subscriber of the second network operator.

In some aspects, the one or more processors are further configured to prioritize the first set of neighbor cells relative to the second set of neighbor cells based at least in part on one or more of: pruning of the second set of neighbor cells or prioritizing of the first set of neighbor cells relative to the second set of neighbor cells based at least in part on the first set of neighbor cells being associated with the first network operator; pruning of the second set of neighbor cells or deprioritizing of the second set of neighbor cells relative to the first set of neighbor cells based at least in part on the second set of neighbor cells being associated with the second network operator; or pruning of the second set of neighbor cells or deprioritizing of the second set of neighbor cells relative to the first set of neighbor cells based at least in part on the second set of neighbor cells not being associated with the first network operator.

In some aspects, the determination that the first set of neighbor cells is associated with a first network operator and that the second set of neighbor cells is associated with a second network operator comprises: a determination, based at least in part on downlink raster values associated with neighbor cells of the first set of neighbor cells, that the first set of neighbor cells is associated with the first network operator; and a determination, based at least in part on downlink raster values associated with neighbor cells of the second set of neighbor cells, that the second set of neighbor cells is not associated with the first network operator.

In some aspects, the determination that the first set of neighbor cells is associated with a first network operator and that the second set of neighbor cells is associated with a second network operator comprises: a determination, based at least in part on obtaining BPLMN information associated with neighbor cells of the first set of neighbor cells, that the first set of neighbor cells is associated with the first network operator; and a determination, based at least in part on obtaining BPLMN information associated with neighbor cells of the second set of neighbor cells, that the second set of neighbor cells is not associated with the first network operator.

In some aspects, the one or more processors are further configured to: obtain the BPLMN information associated with neighbor cells of the first set of neighbor cells based at least in part on a BPLMN search; obtain the BPLMN information associated with neighbor cells of the second set of neighbor cells based at least in part on a BPLMN search; or obtain the BPLMN information associated with neighbor cells of the first set of neighbor cells and obtain the BPLMN information associated with neighbor cells of the second set of neighbor cells, based at least in part on a BPLMN search.

In some aspects, the first network operator is associated with a first PLMN, and wherein the second network operator is associated with a second PLMN.

In some aspects, the base station provides a cell for the first network operator and the second network operator using the second RAT.

In some aspects, the one or more processors are further configured to: transmit, to the base station, a measurement report that indicates a preferred cell, of the first set of neighbor cells, for one or more of a redirection or a handover operation.

In some aspects, a non-transitory computer-readable medium storing a set of instructions for wireless communication includes one or more instructions that, when executed by one or more processors of a UE, cause the UE to: receive, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT; determine that the first set of neighbor cells is associated with a first network operator and that the second set of neighbor cells is associated with a second network operator; and measure at least one neighbor cell of the neighbor cell list based at least in part on prioritization of the first set of neighbor cells relative to the second set of neighbor cells.

In some aspects, the one or more instructions, that cause the UE to: deprioritize the second set of neighbor cells relative to the first set of neighbor cells; or prune entries for the second set of neighbor cells from the neighbor cell list.

In some aspects, the one or more instructions further cause the UE to prioritize the first set of neighbor cells relative to the second set of neighbor cells based at least in part on one or more of: the UE having access to a first network associated with the first network operator and not having access to second network associated with the second network operator, or the UE being a subscriber of the first network operator and not being a subscriber of the second network operator.

In some aspects, the one or more instructions further cause the UE to prioritize the first set of neighbor cells relative to the second set of neighbor cells based at least in part on one or more of: pruning of the second set of neighbor cells or prioritizing of the first set of neighbor cells relative to the second set of neighbor cells based at least in part on the first set of neighbor cells being associated with the first network operator; pruning of the second set of neighbor cells or deprioritizing of the second set of neighbor cells relative to the first set of neighbor cells based at least in part on the second set of neighbor cells being associated with the second network operator; or pruning of the second set of neighbor cells or deprioritizing of the second set of neighbor cells relative to the first set of neighbor cells based at least in part on the second set of neighbor cells not being associated with the first network operator.

In some aspects, the one or more instructions further cause the UE to: determine, based at least in part on downlink raster values associated with neighbor cells of the first set of neighbor cells, that the first set of neighbor cells is associated with the first network operator; and determine, based at least in part on downlink raster values associated with neighbor cells of the second set of neighbor cells, that the second set of neighbor cells is not associated with the first network operator.

In some aspects, the one or more instructions further cause the UE to: determine, based at least in part on obtaining BPLMN information associated with neighbor cells of the first set of neighbor cells, that the first set of neighbor cells is associated with the first network operator; and determine, based at least in part on obtaining BPLMN information associated with neighbor cells of the second set of neighbor cells, that the second set of neighbor cells is not associated with the first network operator.

In some aspects, the one or more instructions further cause the UE to: obtain the BPLMN information associated with neighbor cells of the first set of neighbor cells based at least in part on a BPLMN search; obtain the BPLMN information associated with neighbor cells of the second set of neighbor cells based at least in part on a BPLMN search; or obtain the BPLMN information associated with neighbor cells of the first set of neighbor cells and obtain the BPLMN information associated with neighbor cells of the second set of neighbor cells, based at least in part on a BPLMN search.

In some aspects, the first network operator is associated with a first PLMN, and wherein the second network operator is associated with a second PLMN.

In some aspects, the base station provides a cell for the first network operator and the second network operator using the second RAT.

In some aspects, the one or more instructions further cause the UE to: transmit, to the base station, a measurement report that indicates a preferred cell, of the first set of neighbor cells, for one or more of a redirection or a handover operation.

In some aspects, an apparatus for wireless communication includes means for receiving, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT; means for determining that the first set of neighbor cells is associated with a first network operator and that the second set of neighbor cells is associated with a second network operator; and means for measuring at least one neighbor cell of the neighbor cell list based at least in part on prioritization of the first set of neighbor cells relative to the second set of neighbor cells.

In some aspects, the means for prioritization of the first set of neighbor cells relative to the second set of neighbor cells comprises: means for deprioritizing the second set of neighbor cells relative to the first set of neighbor cells; or means for pruning entries for the second set of neighbor cells from the neighbor cell list.

In some aspects, the apparatus includes means for prioritizing the first set of neighbor cells relative to the second set of neighbor cells based at least in part on one or more of: the apparatus having access to a first network associated with the first network operator and not having access to second network associated with the second network operator, or the apparatus being a subscriber of the first network operator and not being a subscriber of the second network operator.

In some aspects, the apparatus includes means for prioritizing the first set of neighbor cells relative to the second set of neighbor cells based at least in part on one or more of: means for pruning the second set of neighbor cells or prioritizing the first set of neighbor cells relative to the second set of neighbor cells based at least in part on the first set of neighbor cells being associated with the first network operator; means for pruning the second set of neighbor cells or deprioritizing the second set of neighbor cells relative to the first set of neighbor cells based at least in part on the second set of neighbor cells being associated with the second network operator; or means for pruning the second set of neighbor cells or deprioritizing the second set of neighbor cells relative to the first set of neighbor cells based at least in part on the second set of neighbor cells not being associated with the first network operator.

In some aspects, the apparatus includes means for determining, based at least in part on downlink raster values associated with neighbor cells of the first set of neighbor cells, that the first set of neighbor cells is associated with the first network operator; and means for determining, based at least in part on downlink raster values associated with neighbor cells of the second set of neighbor cells, that the second set of neighbor cells is not associated with the first network operator.

In some aspects, the apparatus includes means for determining, based at least in part on obtaining BPLMN information associated with neighbor cells of the first set of neighbor cells, that the first set of neighbor cells is associated with the first network operator; and means for determining, based at least in part on obtaining BPLMN information associated with neighbor cells of the second set of neighbor cells, that the second set of neighbor cells is not associated with the first network operator.

In some aspects, the apparatus includes one or more of: means for obtaining the BPLMN information associated with neighbor cells of the first set of neighbor cells based at least in part on a BPLMN search; or means for obtaining the BPLMN information associated with neighbor cells of the second set of neighbor cells based at least in part on a BPLMN search.

In some aspects, the first network operator is associated with a first PLMN, and wherein the second network operator is associated with a second PLMN.

In some aspects, the base station provides a cell for the first network operator and the second network operator using the second RAT.

In some aspects, the apparatus includes means for transmitting, to the base station, a measurement report that indicates a preferred cell, of the first set of neighbor cells, for one or more of a redirection or a handover operation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 1:
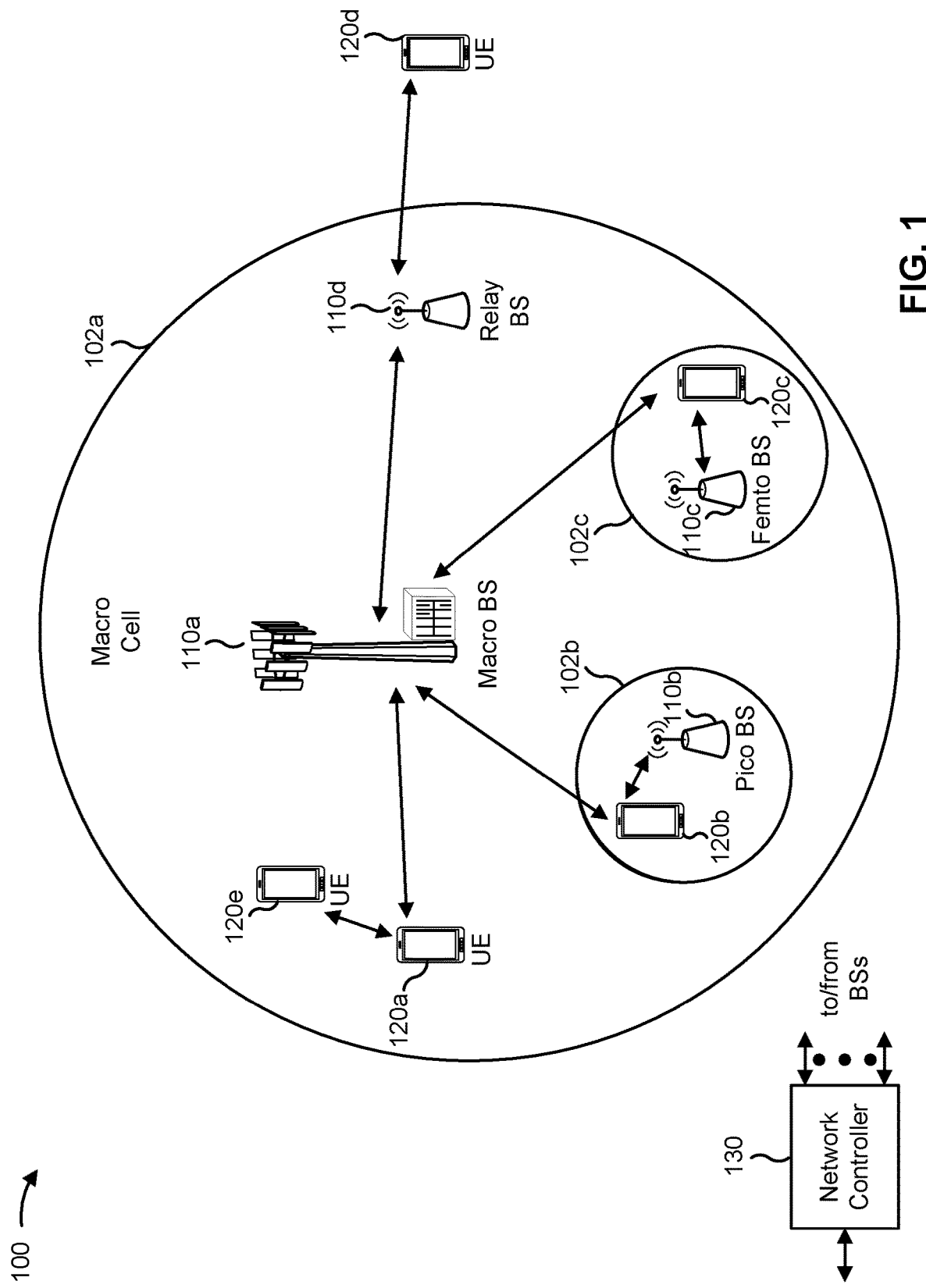
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
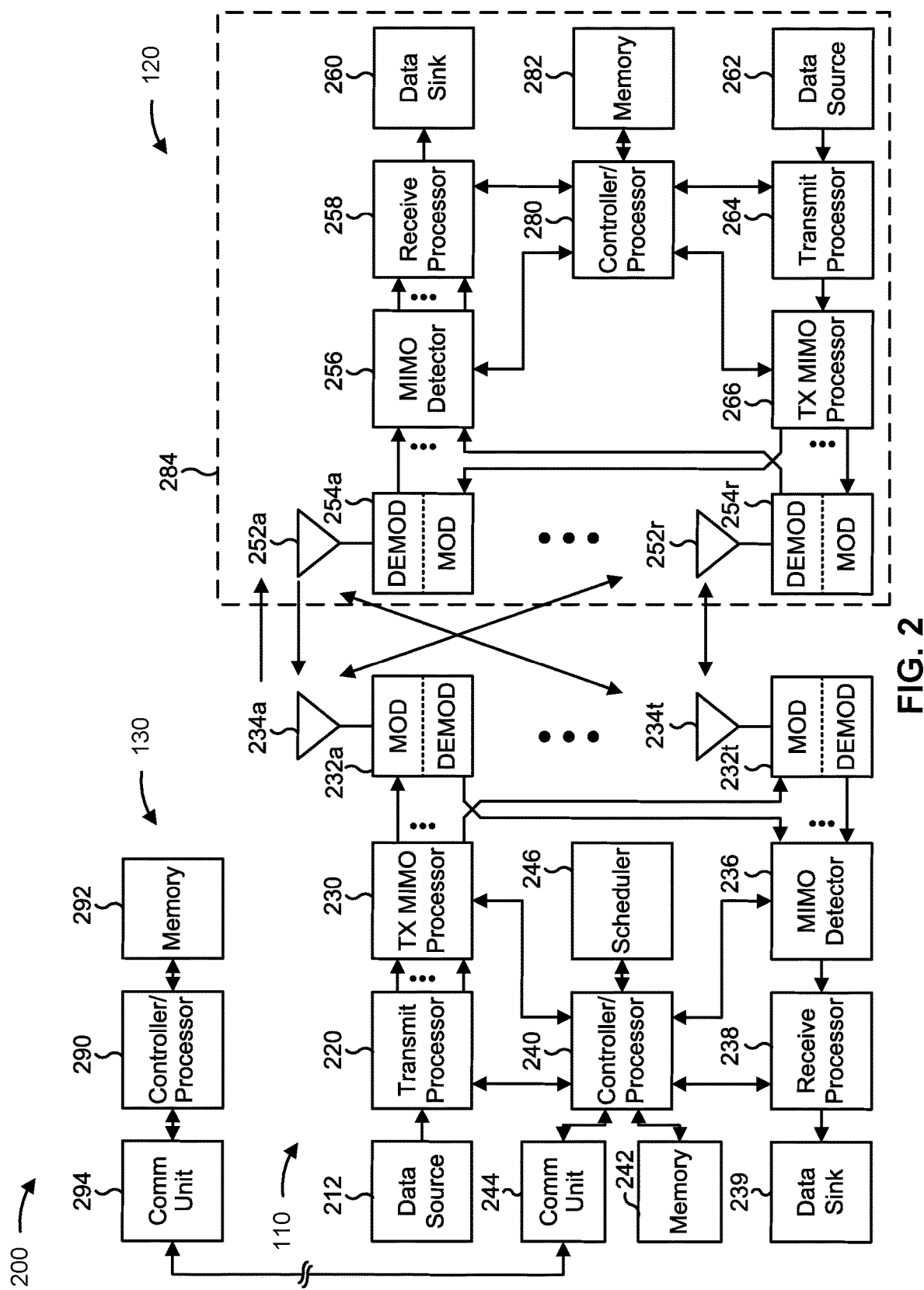
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with techniques for measuring neighbor cells using prioritization of the neighbor cells that is based at least in part on associations of the neighbor cells with network operators, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions.

In some aspects, the UE includes means for receiving, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT; means for determining that the first set of neighbor cells is associated with a first network operator and that the second set of neighbor cells is associated with a second network operator; or means for measuring at least one neighbor cell of the neighbor cell list based at least in part on prioritization of the first set of neighbor cells relative to the second set of neighbor cells. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for deprioritizing the second set of neighbor cells relative to the first set of neighbor cells; or means for pruning entries for the second set of neighbor cells from the neighbor cell list.

In some aspects, the UE includes means for prioritizing the first set of neighbor cells relative to the second set of neighbor cells based at least in part on one or more of:

In some aspects, the UE includes means for prioritizing the first set of neighbor cells relative to the second set of neighbor cells based at least in part on one or more of: means for pruning the second set of neighbor cells or prioritizing the first set of neighbor cells relative to the second set of neighbor cells based at least in part on the first set of neighbor cells being associated with the first network operator; means for pruning the second set of neighbor cells or deprioritizing the second set of neighbor cells relative to the first set of neighbor cells based at least in part on the second set of neighbor cells being associated with the second network operator; or means for pruning the second set of neighbor cells or deprioritizing the second set of neighbor cells relative to the first set of neighbor cells based at least in part on the second set of neighbor cells not being associated with the first network operator.

In some aspects, the UE includes means for determining, based at least in part on downlink raster values associated with neighbor cells of the first set of neighbor cells, that the first set of neighbor cells is associated with the first network operator; or means for determining, based at least in part on downlink raster values associated with neighbor cells of the second set of neighbor cells, that the second set of neighbor cells is not associated with the first network operator.

In some aspects, the UE includes means for determining, based at least in part on obtaining BPLMN information associated with neighbor cells of the first set of neighbor cells, that the first set of neighbor cells is associated with the first network operator; or means for determining, based at least in part on obtaining BPLMN information associated with neighbor cells of the second set of neighbor cells, that the second set of neighbor cells is not associated with the first network operator.

In some aspects, the UE includes means for obtaining the BPLMN information associated with neighbor cells of the first set of neighbor cells based at least in part on a BPLMN search; or means for obtaining the BPLMN information associated with neighbor cells of the second set of neighbor cells based at least in part on a BPLMN search.

In some aspects, the UE includes means for transmitting, to the base station, a measurement report that indicates a preferred cell, of the first set of neighbor cells, for one or more of a redirection or a handover operation.

As indicated above, FIG. 2 is provided as an example. Other examples may differ from what is described with regard to FIG. 2.

Figure 3:
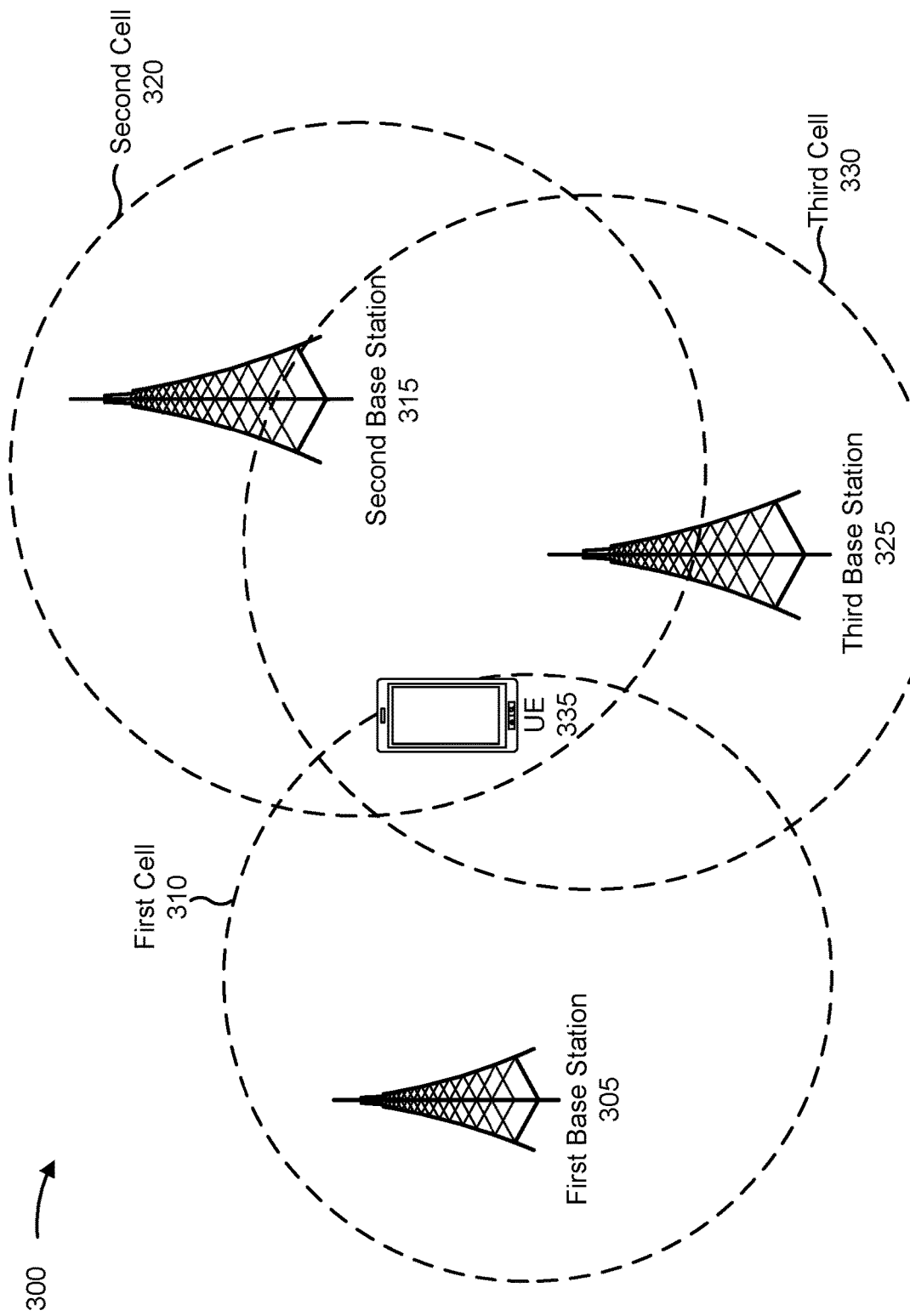
FIG. 3 is a diagram illustrating an example of an environment for a handover operation, in accordance with various aspects of the present disclosure.

FIG. 3 is a diagram illustrating an example 300 of an environment for a handover operation, in accordance with various aspects of the present disclosure. As shown in FIG. 3, a first base station 305 may provide a first cell 310 for wireless communication, a second base station 315 may provide a second cell 320 for wireless communication, and a third base station 325 may provide a second cell 330 for wireless communication. A UE may be configured to communicate via a network operator associated with one or more of the first cell 310, the second cell 320, and/or the third cell 330.

The first cell 310 may allow access to UEs that are subscribers (e.g., have access via a subscription) to multiple network operators, including a first network operator and a second network operator. In other words, the first cell 310 may be a shared cell that is shared between the multiple network operators. The first base station 305 and/or the first cell 310 may be associated with (e.g., may operate using) a first RAT.

The second cell 320 may allow access to UEs that are subscribers (e.g., have access via a subscription) to a single network operator, or fewer than all network operators allowed access to the first cell 310, including the first network operator and not the second network operator. In other words, the third cell is not shared between the first network operator and the second network operator. The second base station 315 and/or the second cell 320 may be associated with (e.g., may operate using) a second RAT that is different from the first RAT.

The third cell 330 may allow access to UEs that are subscribers (e.g., have access via a subscription) to a single network operator, or fewer than all network operators allowed access to the first cell 310, including the second network operator and not the first network operator. In other words, the third cell is not shared between the first network operator and the second network operator. The second base station 315 and/or the second cell 320 may be associated with (e.g., may operate using) a second RAT that is different from the first RAT.

The UE 335 may be a subscriber to the first network operator and not the second network operator. The UE 335 may be configured to communicate via the first RAT and/or the second RAT. The UE 335 may communicate, using the first cell 310 and the first RAT, via a first network associated with the first network operator.

Based at least in part on location information, channel conditions, and/or other parameters, the UE 335 may be configured to perform a redirection and/or handover operation to handover a network connection to a neighbor cell (e.g., the second cell 320 or the third cell 330). The first base station 305 may transmit a neighbor cell list, to the UE 335, that the UE is to use to schedule searching and measuring neighbor cells to determine a preferred target cell for the redirection and/or handover operation.

Based at least in part on the first cell 310 being configured for the first network operator and the second network operator, the neighbor cell list may include entries for neighbor cells that are associated with the first network operator and the second network operator. The UE 335 may determine (e.g., based at least in part on measurements associated with the third cell 330) that the third cell 330 is the preferred target cell for the redirection and/or handover operation. The first base station 305 may initiate a redirection and handover to the third cell 330. However, based at least in part on the UE 335 not being a subscriber to the third cell 330, the redirection and handover operation will fail. For example, the third base station 325 may determine that a PLMN to which the UE 335 is a subscriber does not match a PLMN of the third cell 330 and may not allow the UE 335 to access a second network associated with the second network operator. The UE 335 may determine that the third cell 330 is associated with a PLMN to which the UE is not a subscriber based at least in part on an indication in a system information block (SIB), such as a SIB1.

Based at least in part on failure of the redirection and handover operation, the UE may experience call failure (e.g., Evolved Packet System (EPS) fallback call failure). Additionally, or alternatively, based at least in part on failure of the redirection and handover operation, the UE may consume computing, power, communication, and/or network resources to reestablish a connection (e.g., using a random access channel operation) with the first network associated with the first network operator.

As indicated above, FIG. 3 is provided as an example. Other examples may differ from what is described with regard to FIG. 3.

In some aspects described herein, a UE may receive, from a base station associated with a first RAT (e.g., NR), a neighbor cell list that includes entries for two or more sets of neighbor cells including at least a first set of neighbor cells and a second set of neighbor cells. The first set of neighbor cells and the second set of neighbor cells may both be associated with a second RAT (e.g., LTE) that is different from the first RAT. In some aspects, the UE may determine which PLMNs are associated with a first cell provided by the base station. For example, the UE may determine which PLMNs are associated with the first cell based at least in part on a SIB (e.g., SIB1) received from the base station.

The UE may determine that the first set of neighbor cells is associated with a first network operator (e.g., a network operator to which the UE has access and/or is a subscriber) and that the second set of neighbor cells is associated with a second network operator (e.g., a network operator to which the UE does not have access and/or is not a subscriber). In some aspects, the UE may determine associations of sets of neighbor cells and network operators based at least in part on operator information provided by the base station.

In some aspects, the UE may determine associations of sets of neighbor cells and network operators based at least in part on frequency downlink raster values, indicated for neighbor cells, being within specific bands that are associated with the network operators. For example, the UE may determine that a first neighbor cell of the first set of neighbor cells is associated with the first network operator based at least in part on a raster value (e.g., a frequency and/or frequency range) indicated for the first neighbor cell being within a band that is associated with the first network operator.

In some aspects, the UE may determine associations of sets of neighbor cells and network operators based at least in part on background PLMN (BPLMN) information detected by the UE. In some aspects, the UE may determine frequencies associated with the neighbor cells based at least in part on a SIB (e.g., SIB5) received from the base station. The UE may acquire the neighbor cells to determine associated PLMNs using based at least in part on a BPLMN search. In some aspects, the UE may determine frequencies and/or acquire the neighbor cells while the UE is in an idle mode and/or a power saving mode. Based at least in part on the UE being in a connected mode, the UE may use a determined association of a PLMN with a frequency, as determined during an idle mode and/or a power saving mode, to determine associations of neighbor cells of the neighbor cell list with PLMNs and/or associated network operators.

In some aspects, the UE may prioritize the first set of neighbor cells relative to the second set of neighbor cells and/or one or more additional sets of neighbor cells based at least in part on a determination that the first set of neighbor cells are associated with the first network operator. Prioritizing of the first set of neighbor cells relative to the second set of neighbor cells may include deprioritizing the second set of neighbor cells relative to the first set of neighbor cells, increasing priorities of neighbor cells of the first set of neighbor cells within the neighbor cell list, and/or pruning entries for the second set of neighbor cells from the neighbor list, among other examples. The UE may search for and/or measure signals from neighbor cells of the first set of neighbor cells within the neighbor cell list, with priority over neighbor cells of the second set of neighbor cells. In this way, the UE may determine that a preferred target cell for redirection and/or handover is a neighbor cell of the first set of neighbor cells, rather than a neighbor cell of the second set of neighbor cells. Based at least in part on the UE prioritizing the first set of neighbor cells relative to the second set of neighbor cells, the UE may determine that a preferred target cell for redirection and/or handover is a neighbor cell of the first set of neighbor cells even if a neighbor cell of the second set of neighbor cells has a stronger signal than the neighbor cell of the first set of neighbor cells.

In this way, the UE may reduce interaction failure rate between communications using the first RAT and communications using the second RAT. This may conserve computing, power, communication, and/or network resources that may otherwise be used to detect and/or recover from a communication failure and/or a redirection and handover failure. Additionally, or alternatively, the UE may conserve computing, communication, and/or power resources that may otherwise have been used to perform a search and/or measurement for neighbor cells to which the UE is not a subscriber and/or to which the UE does not have access.

Figure 4:
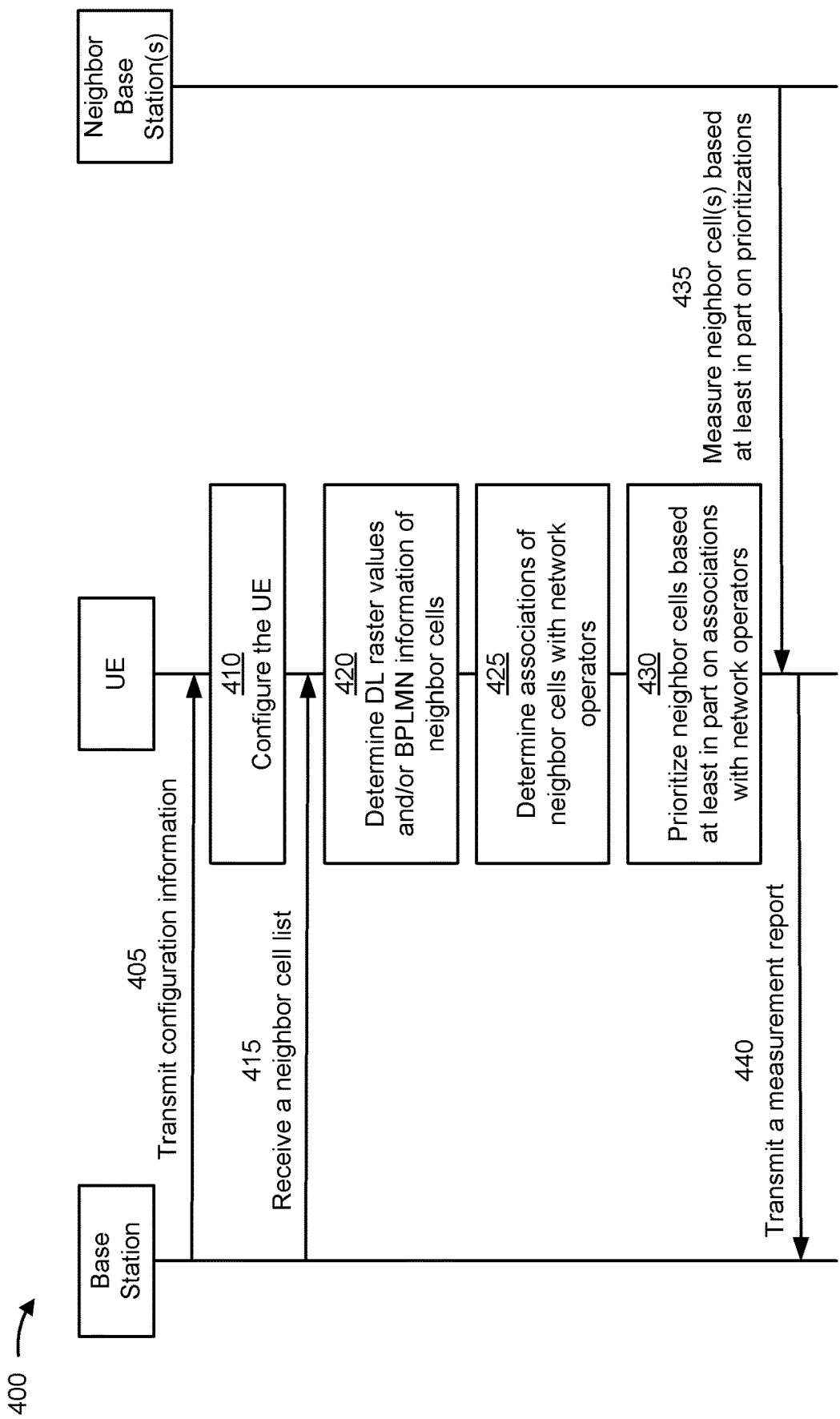
FIG. 4 is a diagram illustrating an example associated with techniques for measuring neighbor cells using prioritization of the neighbor cells that is based at least in part on associations of the neighbor cells with network operators, in accordance with various aspects of the present disclosure.

FIG. 4 is a diagram illustrating an example 400 associated with techniques for generating a neighbor cell list based at least in part on associations with different networks, in accordance with various aspects of the present disclosure. As shown in FIG. 4, a UE (e.g., UE 120) may communicate with a base station (e.g., base station 110) and/or one or more neighbor base stations (e.g., base stations 110). Additionally, or alternatively, the base station may communicate with the one or more neighbor base stations. The UE, the base station, and/or a first set of neighbor base stations may be part of a first wireless network (e.g., wireless network 100) associated with a first network operator (e.g., a first PLMN). Additionally, or alternatively, the base station and/or a second set of neighbor base stations may be part of a second wireless network (e.g., wireless network 100) associated with a second network operator to which the UE is not a subscriber and/or to which the UE does not have access.

In some aspects, the base station may provide a first cell associated with a first RAT (e.g., NR) though which the UE communicates with the first network associated with the first network operator. In some aspects, the neighbor base stations may be associated with a second RAT (e.g., LTE). In some aspects, the first cell may be shared by the first network operator and the second network operator (e.g., based at least in part on being associated with the first RAT). In some aspects, the neighbor cells may not be shared by the first network operator and the second network operator (e.g., based at least in part on being associated with the second RAT).

As shown by reference number 405, the base station may transmit, and the UE may receive, configuration information. In some aspects, the UE may receive configuration information from another device (e.g., from another base station, TRP associated with the base station, and/or another UE, among other examples) and/or a communication standard, among other examples. In some aspects, the UE may receive the configuration information via one or more of radio resource control (RRC) signaling or medium access control control element (MAC-CE) signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to determine downlink raster values and/or BPLMN information associated with neighbor cells. In some aspects, the configuration information may indicate that the UE is to determine, from a neighbor cell list, associations of neighbor cells with network operators. For example, the configuration information may indicate that the UE is to determine that a first set of neighbor cells is associated with a first network operator and that a second set of neighbor cells is associated with a second network operator (e.g., based at least in part on the downlink raster values and/or the BPLMN information). In some aspects, the configuration information may indicate that the UE is to prioritize neighbor cells based at least in part on associations with network operators. For example, the configuration information may indicate that the UE is to prioritize the first set of neighbor cells relative to the second set of neighbor cells based at least in part on the first set of neighbor cells being associated with the first network operator (e.g., a network operator to which the UE is a subscriber and/or to which the UE has access). In some aspects, the configuration information may indicate that the UE is to schedule and/or measure neighbor base stations, based at least in part on the prioritizations, using information provided in the neighbor cell list, and to transmit an associated measurement report to the base station.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, a neighbor cell list. For example, the UE may receive a neighbor cell list including entries for two or more sets of neighbor cells. The two or more sets of neighbor cells may include at least a first set of neighbor cells and a second set of neighbor cells. The first set of neighbor cells and the second set of neighbor cells may be associated with a second RAT that is different from the first RAT.

As shown by reference number 420, the UE may determine downlink (DL) raster values and/or BPLMN information of neighbor cells. In some aspects, the UE may determine downlink raster values of neighbor cells based at least in part on an indication from the base station. For example, the base station may indicate raster values of the neighbor cells within the neighbor cell list. The neighbor cell list may include the raster values (e.g., frequencies and/or frequency ranges) mapped to the neighbor cells so that the UE can search for the neighbor cells.

In some aspects, the UE may obtain BPLMN information associated with neighbor cells (e.g., of the first set of neighbor cells and/or the second set of neighbor cells) based at least in part on a BPLMN search. In some aspects, the BPLMN search may include one or more searching operations. For example, the UE may determine frequencies and/or acquire the neighbor cells while the UE is in an idle mode and/or a power saving mode.

As shown by reference number 425, the UE may determine associations of neighbor cells with network operators. In some aspects, the UE may determine, based at least in part on a raster value for a neighbor cell being within a band (e.g., a frequency band) that is associated with a network operator, that the neighbor cell is associated with the network operator.

In some aspects, the UE may determine, based at least in part on the downlink raster values of neighbor cells of the first set of neighbor cells, that the first set of neighbor cells is associated with the first network operator. In some aspects, the UE may determine, based at least in part on the downlink raster values of neighbor cells of the second set of neighbor cells, that the second set of neighbor cells is associated with the second network operator and/or that the second set of neighbor cells is not associated with the first network operator. In some aspects, the UE may similarly determine, based at least in part on raster values, that additional sets of neighbor cells are associated with additional network operators and/or that the additional sets of neighbor cells are not associated with the first network operator.

In some aspects, the UE (e.g., in a connected mode) may use a determined association of a PLMN with a frequency (e.g., as determined during an idle mode and/or a power saving mode) to determine associations of neighbor cells of the neighbor cell list with PLMNs and/or associated network operators. For example, the UE may determine that the first set of neighbor cells is associated with the first network operator based at least in part on BPLMN information associated with neighbor cells of the first set of neighbor cells. Additionally, or alternatively, the UE may determine that the second set of neighbor cells is associated with the second network operator, and/or is not associated with the first network operator, based at least in part on BPLMN information associated with neighbor cells of the second set of neighbor cells.

As shown by reference number 430, the UE may prioritize neighbor cells based at least in part on associations with network operators. In some aspects, the UE may prioritize neighbor cells of the first set of neighbor cells relative to the second set of neighbor cells based at least in part on deprioritizing the second set of neighbor cells relative to the first set of neighbor cells (e.g., within the neighbor cell list and/or for configuring scheduling searches and/or measurements of neighbor cells, among other examples). In some aspects, the UE may prioritize neighbor cells of the first set of neighbor cells based at least in part on pruning (e.g., deleting, removing, and/or ignoring, among other examples) entries for the second set of neighbor cells from the neighbor cell list. In some aspects, the UE may prune the second set of neighbor cells or prioritize the first set of neighbor cells relative to the second set of neighbor cells based at least in part on the first set of neighbor cells being associated with the first network operators. In some aspects, the UE may prune the second set of neighbor cells or prioritize the first set of neighbor cells relative to the second set of neighbor cells based at least in part on the second set of neighbor cells being associated with the second network operator and/or not being associated with the first network operator. In some aspects, the UE may similarly prioritize the first set of neighbor cells relative to one or more additional sets of neighbor cells (e.g., that are not associated with the first network operator).

In some aspects, the UE may prioritize neighbor cells of the first set of neighbor cells relative to the second set of neighbor cells based at least in part on the UE having the UE having access, and/or being a subscriber, to a first network associated with the first network operator and not having access, and/or not being a subscriber, to the second network associated with the second network operator.

As shown by reference number 435, the UE may measure one or more neighbor base cells based at least in part on prioritizations of the neighbor cells. For example, the UE may measure at least one neighbor cell of the neighbor cell list based at least in part on prioritization of the first set of neighbor cells relative to the second set of neighbor cells. In some aspects, the UE may measure the first set of neighbor cells before measuring the second set of neighbor cells. In some aspects, the UE may measure the first set of neighbor cells and not measure the second set of neighbor cells.

As shown by reference number 440, the UE may transmit, and the base station may receive, a measurement report. In some aspects, the UE may indicate (e.g., implicitly and/or explicitly) a preferred neighbor cell for a redirection and/or handover operation. In some aspects, the UE may indicate a neighbor cell of the first set of neighbor cells as the preferred neighbor cell based at least in part on prioritizing the first set of neighbor cells relative to the second set of neighbor cells.

In this way, the UE may reduce interaction failure rate between communications using the first RAT and communications using the second RAT (e.g., for a redirection and/or handover operation). This may conserve computing, power, communication, and/or network resources that may otherwise be used to detect and/or recover from a communication failure and/or a redirection and handover failure that is based at least in part on an attempt to handover the UE to a cell to which the UE is not a subscriber and/or to which the UE does not have access. Additionally, or alternatively, the UE may conserve computing, communication, and/or power resources that may otherwise have been used to perform a search and/or measurement for neighbor cells to which the UE is not a subscriber and/or to which the UE does not have access.

Figure 5:
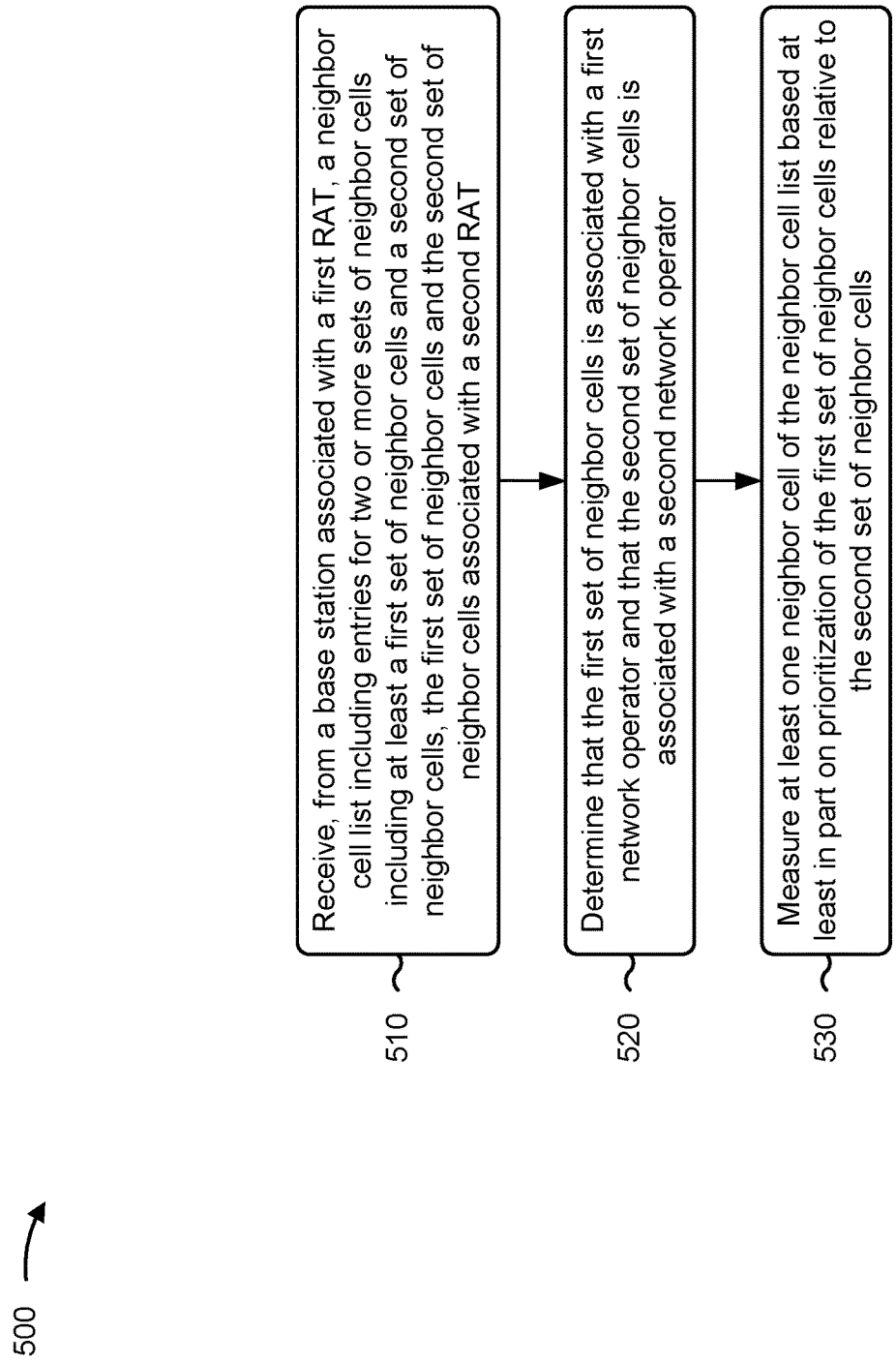
FIG. 5 is a diagram illustrating an example process associated with techniques for measuring neighbor cells using prioritization of the neighbor cells that is based at least in part on associations of the neighbor cells with network operators, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with techniques for measuring neighbor cells using prioritization of the neighbor cells that is based at least in part on associations of the neighbor cells with network operators.

As shown in FIG. 5, in some aspects, process 500 may include receiving, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT (block 510). For example, the UE (e.g., using reception component 602, depicted in FIG. 6) may receive, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT, as described above.

As further shown in FIG. 5, in some aspects, process 500 may include determining that the first set of neighbor cells is associated with a first network operator and that the second set of neighbor cells is associated with a second network operator (block 520). For example, the UE (e.g., using determination component 608, depicted in FIG. 6) may determine that the first set of neighbor cells is associated with a first network operator and that the second set of neighbor cells is associated with a second network operator, as described above.

As further shown in FIG. 5, in some aspects, process 500 may include measuring at least one neighbor cell of the neighbor cell list based at least in part on prioritization of the first set of neighbor cells relative to the second set of neighbor cells (block 530). For example, the UE (e.g., using reception component 602, depicted in FIG. 6) may measure at least one neighbor cell of the neighbor cell list based at least in part on prioritization of the first set of neighbor cells relative to the second set of neighbor cells, as described above.

Process 500 may include additional aspects, such as any single aspect or any combination of aspects described below and/or in connection with one or more other processes described elsewhere herein.

In a first aspect, prioritization of the first set of neighbor cells relative to the second set of neighbor cells comprises deprioritizing the second set of neighbor cells relative to the first set of neighbor cells, or pruning entries for the second set of neighbor cells from the neighbor cell list.

In a second aspect, alone or in combination with the first aspect, process 500 includes prioritizing the first set of neighbor cells relative to the second set of neighbor cells based at least in part on one or more of the UE having access to a first network associated with the first network operator and not having access to second network associated with the second network operator, or the UE being a subscriber of the first network operator and not being a subscriber of the second network operator.

In a third aspect, alone or in combination with one or more of the first and second aspects, process 500 includes prioritizing the first set of neighbor cells relative to the second set of neighbor cells based at least in part on one or more of pruning the second set of neighbor cells or prioritizing the first set of neighbor cells relative to the second set of neighbor cells based at least in part on the first set of neighbor cells being associated with the first network operator, pruning the second set of neighbor cells or deprioritizing the second set of neighbor cells relative to the first set of neighbor cells based at least in part on the second set of neighbor cells being associated with the second network operator, or pruning the second set of neighbor cells or deprioritizing the second set of neighbor cells relative to the first set of neighbor cells based at least in part on the second set of neighbor cells not being associated with the first network operator.

In a fourth aspect, alone or in combination with one or more of the first through third aspects, the determination that the first set of neighbor cells is associated with a first network operator and that the second set of neighbor cells is associated with a second network operator comprises determining, based at least in part on downlink raster values associated with neighbor cells of the first set of neighbor cells, that the first set of neighbor cells is associated with the first network operator, and determining, based at least in part on downlink raster values associated with neighbor cells of the second set of neighbor cells, that the second set of neighbor cells is not associated with the first network operator.

In a fifth aspect, alone or in combination with one or more of the first through fourth aspects, the determination that the first set of neighbor cells is associated with a first network operator and that the second set of neighbor cells is associated with a second network operator comprises determining, based at least in part on obtaining BPLMN information associated with neighbor cells of the first set of neighbor cells, that the first set of neighbor cells is associated with the first network operator, and determining, based at least in part on obtaining BPLMN information associated with neighbor cells of the second set of neighbor cells, that the second set of neighbor cells is not associated with the first network operator.

In a sixth aspect, alone or in combination with one or more of the first through fifth aspects, process 500 includes one or more of obtaining the BPLMN information associated with neighbor cells of the first set of neighbor cells based at least in part on a BPLMN search, or obtaining the BPLMN information associated with neighbor cells of the second set of neighbor cells based at least in part on a BPLMN search.

In a seventh aspect, alone or in combination with one or more of the first through sixth aspects, the first network operator is associated with a first PLMN, and wherein the second network operator is associated with a second PLMN.

In an eighth aspect, alone or in combination with one or more of the first through seventh aspects, the base station provides a cell for the first network operator and the second network operator using the second RAT.

In a ninth aspect, alone or in combination with one or more of the first through eighth aspects, process 500 includes transmitting, to the base station, a measurement report that indicates a preferred cell, of the first set of neighbor cells, for one or more of a redirection or a handover operation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
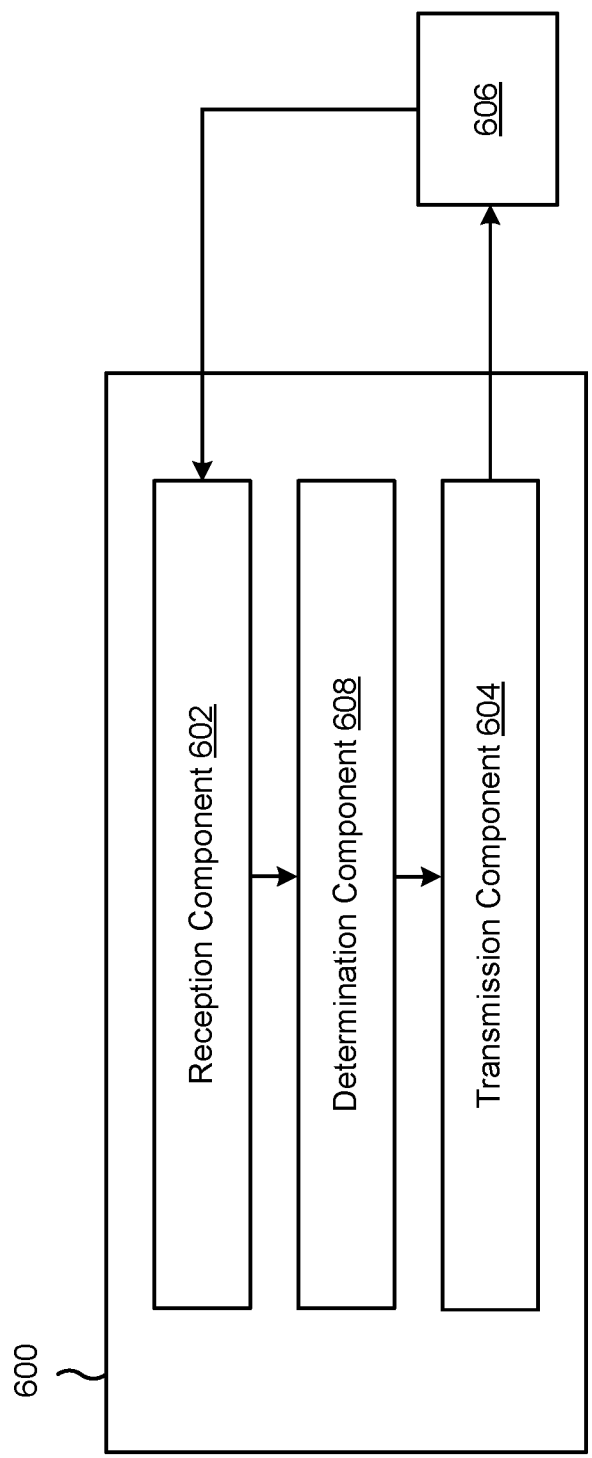
FIGS. 6 and 7 are block diagrams of example apparatuses for wireless communication, in accordance with various aspects of the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608.

In some aspects, the apparatus 600 may be configured to perform one or more operations described herein in connection with FIGS. 3 and/or 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT. The determination component 608 may determine that the first set of neighbor cells is associated with a first network operator and that the second set of neighbor cells is associated with a second network operator. The reception component 602 may measure at least one neighbor cell of the neighbor cell list based at least in part on prioritization of the first set of neighbor cells relative to the second set of neighbor cells.

The determination component 608 may prioritize the first set of neighbor cells relative to the second set of neighbor cells based at least in part on one or more of the UE having access to a first network associated with the first network operator and not having access to second network associated with the second network operator, or the UE being a subscriber of the first network operator and not being a subscriber of the second network operator.

The determination component 608 may prioritize the first set of neighbor cells relative to the second set of neighbor cells based at least in part on one or more of pruning the second set of neighbor cells or prioritizing the first set of neighbor cells relative to the second set of neighbor cells based at least in part on the first set of neighbor cells being associated with the first network operator; pruning the second set of neighbor cells or deprioritizing the second set of neighbor cells relative to the first set of neighbor cells based at least in part on the second set of neighbor cells being associated with the second network operator; or pruning the second set of neighbor cells or deprioritizing the second set of neighbor cells relative to the first set of neighbor cells based at least in part on the second set of neighbor cells not being associated with the first network operator.

The transmission component 604 may transmit, to the base station, a measurement report that indicates a preferred cell, of the first set of neighbor cells, for one or more of a redirection or a handover operation.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
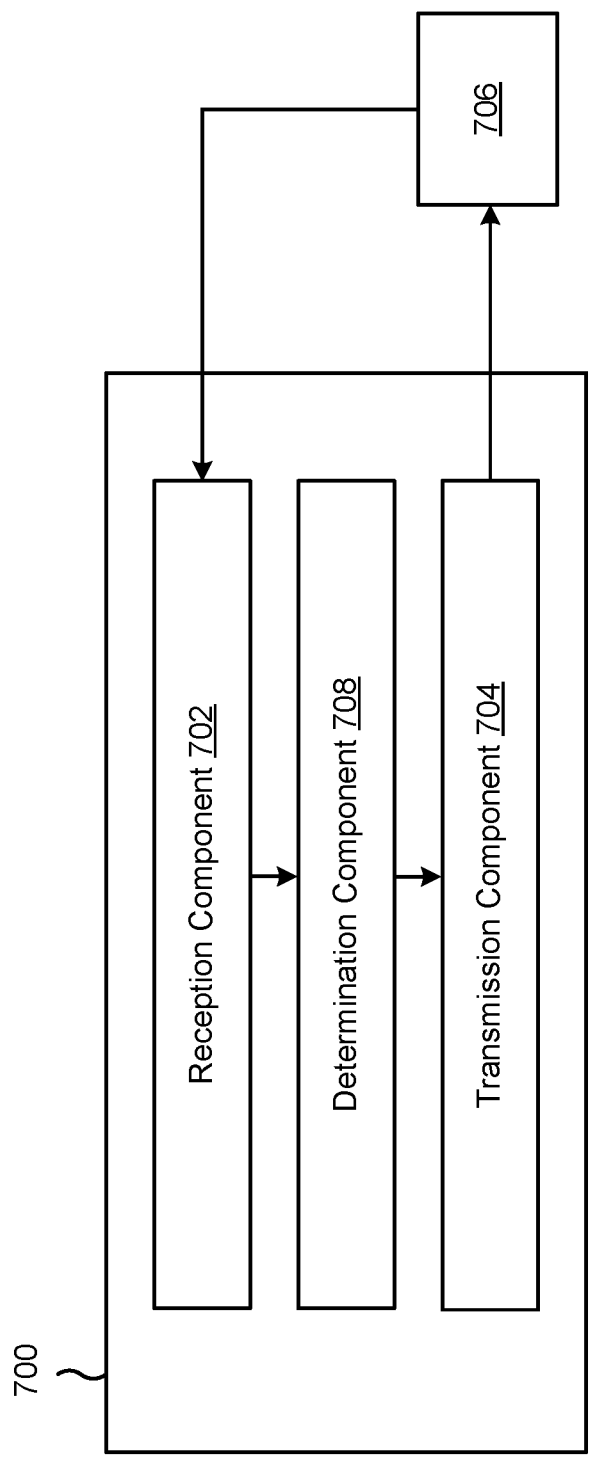

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a base station, a base station, or another wireless communication device) using the reception component 702 and the transmission component 704. As further shown, the apparatus 700 may include a determination component 708.

In some aspects, the apparatus 700 may be configured to perform one or more operations described herein in connection with FIGS. 3 and/or 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit configuration information to a UE. The transmission component 704 may transmit, to the UE, a neighbor cell list including entries for two or more sets of neighbor cells including at least a first set of neighbor cells and a second set of neighbor cells, the first set of neighbor cells and the second set of neighbor cells associated with a second RAT. The reception component 702 may receive, from the UE, a measurement report that indicates a preferred cell, of the first set of neighbor cells, for one or more of a redirection or a handover operation. The determination component 708 may determine a neighbor cell for a redirection and/or a handover operation for the UE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a UE, comprising: receiving, from a base station associated with a first RAT, a neighbor cell list including entries for two or more sets of neighbor cells including at least a first set of neighbor cells and a second set of neighbor cells, the first set of neighbor cells and the second set of neighbor cells associated with a second RAT; determining that the first set of neighbor cells is associated with a first network operator and that the second set of neighbor cells is associated with a second network operator; and measuring at least one neighbor cell of the neighbor cell list based at least in part on prioritization of the first set of neighbor cells relative to the second set of neighbor cells.

Aspect 2: The method of aspect 1, wherein prioritization of the first set of neighbor cells relative to the second set of neighbor cells comprises: deprioritizing the second set of neighbor cells relative to the first set of neighbor cells; or pruning entries for the second set of neighbor cells from the neighbor cell list.

Aspect 3: The method of any of aspects 1 or 2, further comprising prioritizing the first set of neighbor cells relative to the second set of neighbor cells based at least in part on one or more of: the UE having access to a first network associated with the first network operator and not having access to second network associated with the second network operator, or the UE being a subscriber of the first network operator and not being a subscriber of the second network operator.

Aspect 4: The method of any of aspects 1 to 3, further comprising prioritizing the first set of neighbor cells relative to the second set of neighbor cells based at least in part on one or more of: pruning the second set of neighbor cells or prioritizing the first set of neighbor cells relative to the second set of neighbor cells based at least in part on the first set of neighbor cells being associated with the first network operator; pruning the second set of neighbor cells or deprioritizing the second set of neighbor cells relative to the first set of neighbor cells based at least in part on the second set of neighbor cells being associated with the second network operator; or pruning the second set of neighbor cells or deprioritizing the second set of neighbor cells relative to the first set of neighbor cells based at least in part on the second set of neighbor cells not being associated with the first network operator.

Aspect 5: The method of any of aspects 1 to 4, wherein the determination that the first set of neighbor cells is associated with a first network operator and that the second set of neighbor cells is associated with a second network operator comprises: determining, based at least in part on downlink raster values associated with neighbor cells of the first set of neighbor cells, that the first set of neighbor cells is associated with the first network operator; and determining, based at least in part on downlink raster values associated with neighbor cells of the second set of neighbor cells, that the second set of neighbor cells is not associated with the first network operator.

Aspect 6: The method of any of aspects 1 to 5, wherein the determination that the first set of neighbor cells is associated with a first network operator and that the second set of neighbor cells is associated with a second network operator comprises: determining, based at least in part on obtaining BPLMN information associated with neighbor cells of the first set of neighbor cells, that the first set of neighbor cells is associated with the first network operator; and determining, based at least in part on obtaining BPLMN information associated with neighbor cells of the second set of neighbor cells, that the second set of neighbor cells is not associated with the first network operator.

Aspect 7: The method of aspect 6, further comprising one or more of: obtaining the BPLMN information associated with neighbor cells of the first set of neighbor cells based at least in part on a BPLMN search; or obtaining the BPLMN information associated with neighbor cells of the second set of neighbor cells based at least in part on a BPLMN search.

Aspect 8: The method of any of aspects 1 to 7, wherein the first network operator is associated with a first PLMN, and wherein the second network operator is associated with a second PLMN.

Aspect 9: The method of any of aspects 1 to 8, wherein the base station provides a cell for the first network operator and the second network operator using the second RAT.

Aspect 10: The method of any of aspects 1 to 9, further comprising: transmitting, to the base station, a measurement report that indicates a preferred cell, of the first set of neighbor cells, for one or more of a redirection or a handover operation.

Aspect 11: An apparatus for wireless communication at a device, comprising a processor; memory coupled with the processor; and instructions stored in the memory and executable by the processor to cause the apparatus to perform the method of one or more aspects of aspects 1-10.

Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station associated with a first radio access technology (RAT), a neighbor cell list including entries for two or more sets of neighbor cells including at least a first set of neighbor cells and a second set of neighbor cells, the first set of neighbor cells and the second set of neighbor cells associated with a second RAT; and
   measuring at least one neighbor cell of the neighbor cell list based at least in part on prioritization of the first set of neighbor cells relative to the second set of neighbor cells.

2. The method of claim 1,
   wherein prioritization of the first set of neighbor cells relative to the second set of neighbor cells comprises:
      deprioritizing the second set of neighbor cells relative to the first set of neighbor cells; or
      pruning entries for the second set of neighbor cells from the neighbor cell list.

3. The method of claim 1, further comprising
   prioritizing the first set of neighbor cells relative to the second set of neighbor cells based at least in part on one or more of:
      the UE having access to a first network associated with a first network operator associated with the first set of neighbor cells and not having access to a second network associated with a second network operator associated with the second set of neighbor cells, or
      the UE being a subscriber of the first network operator and not being a subscriber of the second network operator.

4. The method of claim 1, further comprising
   prioritizing the first set of neighbor cells relative to the second set of neighbor cells based at least in part on one or more of:
      pruning the second set of neighbor cells or prioritizing the first set of neighbor cells relative to the second set of neighbor cells based at least in part on the first set of neighbor cells being associated with a first network operator associated with the first set of neighbor cells;
      pruning the second set of neighbor cells or deprioritizing the second set of neighbor cells relative to the first set of neighbor cells based at least in part on the second set of neighbor cells being associated with a second network operator associated with the second set of neighbor cells; or
      pruning the second set of neighbor cells or deprioritizing the second set of neighbor cells relative to the first set of neighbor cells based at least in part on the second set of neighbor cells not being associated with the first network operator.

5. The method of claim 1, wherein, based at least in part on downlink raster values associated with neighbor cells of the first set of neighbor cells, the first set of neighbor cells is associated with a first network operator; and
   wherein, based at least in part on downlink raster values associated with neighbor cells of the second set of neighbor cells, the second set of neighbor cells is not associated with the first network operator.

6. The method of claim 1, further comprising:
identifying, based at least in part on obtaining background public land mobile network (BPLMN) information associated with neighbor cells of the first set of neighbor cells, that the first set of neighbor cells is associated with a first network operator; and
identifying, based at least in part on obtaining BPLMN information associated with neighbor cells of the second set of neighbor cells, that the second set of neighbor cells is not associated with the first network operator.

7. The method of claim 6, further comprising one or more of:
obtaining the BPLMN information associated with neighbor cells of the first set of neighbor cells based at least in part on a BPLMN search; or
obtaining the BPLMN information associated with neighbor cells of the second set of neighbor cells based at least in part on a BPLMN search.

8. The method of claim 6,
wherein the first network operator is associated with a first public land mobile network (PLMN), and
wherein a second network operator is associated with a second PLMN.

9. The method of claim 8,
wherein the base station provides a cell for the first network operator and the second network operator using the second RAT.

10. The method of claim 1, further comprising:
transmitting, to the base station, a measurement report that indicates a preferred cell, of the first set of neighbor cells, for one or more of a redirection or a handover operation.

11. A user equipment (UE) for wireless communication, comprising:
one or more memories; and
one or more processors, coupled to the one or more memories, the one or more processors configured to:
receive, from a base station associated with a first radio access technology (RAT), a neighbor cell list including entries for two or more sets of neighbor cells including at least a first set of neighbor cells and a second set of neighbor cells, the first set of neighbor cells and the second set of neighbor cells associated with a second RAT; and
at least one neighbor cell of the neighbor cell list based at least in part on prioritization of the first set of neighbor cells relative to the second set of neighbor cells.

12. The UE of claim 11,
wherein the one or more processors are further configured to:
deprioritize the second set of neighbor cells relative to the first set of neighbor cells; or
prune entries for the second set of neighbor cells from the neighbor cell list.

13. The UE of claim 11,
wherein the one or more processors are further configured to prioritize the first set of neighbor cells relative to the second set of neighbor cells based at least in part on one or more of:
the UE having access to a first network associated with a first network operator associated with the first set of neighbor cells and not having access to a second network associated with a second network operator associated with the second set of neighbor cells, or
the UE being a subscriber of the first network operator and not being a subscriber of the second network operator.

14. The UE of claim 11,
wherein the one or more processors are further configured to prioritize the first set of neighbor cells relative to the second set of neighbor cells based at least in part on one or more of:
pruning of the second set of neighbor cells or prioritizing of the first set of neighbor cells relative to the second set of neighbor cells based at least in part on the first set of neighbor cells being associated with a first network operator associated with the first set of neighbor cells;
pruning of the second set of neighbor cells or deprioritizing of the second set of neighbor cells relative to the first set of neighbor cells based at least in part on the second set of neighbor cells being associated with a second network operator associated with the second set of neighbor cells; or
pruning of the second set of neighbor cells or deprioritizing of the second set of neighbor cells relative to the first set of neighbor cells based at least in part on the second set of neighbor cells not being associated with the first network operator.

15. The UE of claim 11, wherein, based at least in part on downlink raster values associated with neighbor cells of the first set of neighbor cells, the first set of neighbor cells is associated with a first network operator; and
wherein, based at least in part on downlink raster values associated with neighbor cells of the second set of neighbor cells, the second set of neighbor cells is not associated with the first network operator.

16. The UE of claim 11,
wherein the one or more processors are further configured to:
identify, based at least in part on obtaining background public land mobile network (BPLMN) information associated with neighbor cells of the first set of neighbor cells, that the first set of neighbor cells is associated with a first network operator; and
identify, based at least in part on obtaining BPLMN information associated with neighbor cells of the second set of neighbor cells, that the second set of neighbor cells is not associated with the first network operator.

17. The UE of claim 16,
wherein the one or more processors are further configured to:
obtain the BPLMN information associated with neighbor cells of the first set of neighbor cells based at least in part on a BPLMN search;
obtain the BPLMN information associated with neighbor cells of the second set of neighbor cells based at least in part on a BPLMN search; or
obtain the BPLMN information associated with neighbor cells of the first set of neighbor cells and obtain the BPLMN information associated with neighbor cells of the second set of neighbor cells, based at least in part on a BPLMN search.

18. The UE of claim 16,
wherein the first network operator is associated with a first public land mobile network (PLMN), and
wherein a second network operator is associated with a second PLMN.

19. The UE of claim 18,
wherein the base station provides a cell for the first network operator and the second network operator using the second RAT.

20. The UE of claim 11,
wherein the one or more processors are further configured to:
transmit, to the base station, a measurement report that indicates a preferred cell, of the first set of neighbor cells, for one or more of a redirection or a handover operation.

21. A non-transitory computer-readable medium storing a set of instructions for wireless communication, the set of instructions comprising:
one or more instructions that, when executed by one or more processors of a user equipment (UE), cause the UE to:
receive, from a base station associated with a first radio access technology (RAT), a neighbor cell list including entries for two or more sets of neighbor cells including at least a first set of neighbor cells and a second set of neighbor cells, the first set of neighbor cells and the second set of neighbor cells associated with a second RAT; and
measure at least one neighbor cell of the neighbor cell list based at least in part on prioritization of the first set of neighbor cells relative to the second set of neighbor cells.

22. The non-transitory computer-readable medium of claim 21,
wherein the one or more instructions cause the UE to:
deprioritize the second set of neighbor cells relative to the first set of neighbor cells; or
prune entries for the second set of neighbor cells from the neighbor cell list.

23. The non-transitory computer-readable medium of claim 21,
wherein the one or more instructions further cause the UE to prioritize the first set of neighbor cells relative to the second set of neighbor cells based at least in part on one or more of:
the UE having access to a first network associated with a first network operator associated with the first set of neighbor cells and not having access to a second network associated with a second network operator associated with the second set of neighbor cells, or
the UE being a subscriber of the first network operator and not being a subscriber of the second network operator.

24. The non-transitory computer-readable medium of claim 21,
wherein the one or more instructions further cause the UE to prioritize the first set of neighbor cells relative to the second set of neighbor cells based at least in part on one or more of:
pruning of the second set of neighbor cells or prioritizing of the first set of neighbor cells relative to the second set of neighbor cells based at least in part on the first set of neighbor cells being associated with a first network operator associated with the first set of neighbor cells;
pruning of the second set of neighbor cells or deprioritizing of the second set of neighbor cells relative to the first set of neighbor cells based at least in part on the second set of neighbor cells being associated with a second network operator associated with the second set of neighbor cells; or
pruning of the second set of neighbor cells or deprioritizing of the second set of neighbor cells relative to the first set of neighbor cells based at least in part on the second set of neighbor cells not being associated with the first network operator.

25. The non-transitory computer-readable medium of claim 21,
wherein the one or more instructions further cause the UE to:
transmit, to the base station, a measurement report that indicates a preferred cell, of the first set of neighbor cells, for one or more of a redirection or a handover operation.

26. An apparatus for wireless communication, comprising:
means for receiving, from a base station associated with a first radio access technology (RAT), a neighbor cell list including entries for two or more sets of neighbor cells including at least a first set of neighbor cells and a second set of neighbor cells, the first set of neighbor cells and the second set of neighbor cells associated with a second RAT;
and
means for measuring at least one neighbor cell of the neighbor cell list based at least in part on prioritization of the first set of neighbor cells relative to the second set of neighbor cells.

27. The apparatus of claim 26,
wherein the means for prioritization of the first set of neighbor cells relative to the second set of neighbor cells comprises:
means for deprioritizing the second set of neighbor cells relative to the first set of neighbor cells; or
means for pruning entries for the second set of neighbor cells from the neighbor cell list.

28. The apparatus of claim 26, further comprising
means for prioritizing the first set of neighbor cells relative to the second set of neighbor cells based at least in part on one or more of:
the apparatus having access to a first network associated with a first network operator associated with the first set of neighbor cells and not having access to a second network associated with a second network operator associated with the second set of neighbor cells, or
the apparatus being a subscriber of the first network operator and not being a subscriber of the second network operator.

29. The apparatus of claim 26, further comprising
means for prioritizing the first set of neighbor cells relative to the second set of neighbor cells based at least in part on one or more of:
means for pruning the second set of neighbor cells or prioritizing the first set of neighbor cells relative to the second set of neighbor cells based at least in part on the first set of neighbor cells being associated with a first network operator associated with the first set of neighbor cells;
means for pruning the second set of neighbor cells or deprioritizing the second set of neighbor cells relative to the first set of neighbor cells based at least in part on the second set of neighbor cells being associated with a second network operator associated with the second set of neighbor cells; or
means for pruning the second set of neighbor cells or deprioritizing the second set of neighbor cells relative to the first set of neighbor cells based at least in part on the second set of neighbor cells not being associated with the first network operator.

30. The apparatus of claim 26, further comprising:
means for transmitting, to the base station, a measurement report that indicates a preferred cell, of the first set of neighbor cells, for one or more of a redirection or a handover operation.

* * * * *